(12) United States Patent
Watanabe et al.

(10) Patent No.: US 11,203,137 B2
(45) Date of Patent: Dec. 21, 2021

(54) RESIN MOLDED PRODUCT AND METHOD FOR PRODUCING RESIN MOLDED PRODUCT

(71) Applicant: KOITO MANUFACTURING CO., LTD., Tokyo (JP)

(72) Inventors: Akira Watanabe, Shizuoka (JP); Takahiro Kohata, Shizuoka (JP); Toshimasa Ikeda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 387 days.

(21) Appl. No.: 15/738,937

(22) PCT Filed: Jun. 2, 2016

(86) PCT No.: PCT/JP2016/066493
§ 371 (c)(1),
(2) Date: Dec. 21, 2017

(87) PCT Pub. No.: WO2016/208355
PCT Pub. Date: Dec. 29, 2016

(65) Prior Publication Data
US 2018/0194046 A1   Jul. 12, 2018

(30) Foreign Application Priority Data

Jun. 23, 2015   (JP) .............................. JP2015-125349

(51) Int. Cl.
*B29C 45/00*   (2006.01)
*B29C 45/64*   (2006.01)
(Continued)

(52) U.S. Cl.
CPC ...... *B29C 45/0046* (2013.01); *B29C 45/0025* (2013.01); *B29C 45/641* (2013.01); (Continued)

(58) Field of Classification Search
CPC ............ B29C 45/0046; B29C 45/0025; B29C 45/641; B29C 45/2708; B29C 45/37; (Continued)

(56) References Cited

U.S. PATENT DOCUMENTS

2002/0050664 A1* 5/2002 Moore, Jr. .......... B29C 45/2701
264/328.12
2004/0224043 A1 11/2004 Kosuge et al.
(Continued)

FOREIGN PATENT DOCUMENTS

JP            03114807 A  *  5/1991  ............ B29C 45/37
JP         2001132566 A      5/2001
(Continued)

OTHER PUBLICATIONS

Office Action dated Sep. 19, 2019 by the Japanese Patent Office in counterpart Japanese Patent Application No. 2015-125349.
(Continued)

*Primary Examiner* — Jacob T Minskey
*Assistant Examiner* — S. Behrooz Ghorishi
(74) *Attorney, Agent, or Firm* — Sughrue Mion, PLLC

(57) ABSTRACT

A resin molded product (10) includes a resin molded product main body (11), and a protrusion (12) integrally formed with the resin molded product main body (11) and protruding from the resin molded product main body (11). At injection molding of the resin molded product (10), molten resin flows through a portion (C-1) corresponding to the protrusion (12) in a cavity (C) defined by a pair of molds (20, 30). A concave portion (14) is formed on a rear side of the protrusion (12), and a bulging portion (12*a*) having a hollow bag shape is formed on a front side of the protrusion (12).

6 Claims, 6 Drawing Sheets

(51) Int. Cl.
  *B29C 45/37* (2006.01)
  *B29L 11/00* (2006.01)
  *B29C 45/27* (2006.01)

(52) U.S. Cl.
  CPC .......... *B29C 45/2708* (2013.01); *B29C 45/37* (2013.01); *B29C 2045/0027* (2013.01); *B29C 2045/0049* (2013.01); *B29C 2045/2716* (2013.01); *B29L 2011/0083* (2013.01)

(58) Field of Classification Search
  CPC .... B29C 2045/0027; B29C 2045/0049; B29C 2045/2716; B29L 2011/0083
  See application file for complete search history.

(56) References Cited

U.S. PATENT DOCUMENTS

| | | | |
|---|---|---|---|
| 2009/0011071 A1* | 1/2009 | Hagihara | B29C 45/0025 425/573 |
| 2011/0170306 A1* | 7/2011 | Yatsuda | F21S 41/295 362/512 |
| 2011/0227253 A1 | 9/2011 | Koshiba | |
| 2014/0087144 A1* | 3/2014 | Endo | B32B 3/28 428/174 |
| 2015/0042003 A1* | 2/2015 | Klaska | B29C 45/2708 264/40.7 |

FOREIGN PATENT DOCUMENTS

| | | |
|---|---|---|
| JP | 2004237586 A | 8/2004 |
| JP | 200996105 A | 5/2009 |
| JP | 2009-129822 A | 6/2009 |
| JP | 2010214749 A | 9/2010 |
| JP | 2011194624 A | 10/2011 |
| JP | 2013199012 A | 10/2013 |

OTHER PUBLICATIONS

International Search Report dated Aug. 2, 2016, issued by the International Searching Authority in counterpart PCT/JP2016/066493 (PCT/ISA/210).

Written Opinion dated Aug. 2, 2016, issued by the International Searching Authority in counterpart PCT/JP2016/066493 (PCT/ISA/237).

* cited by examiner

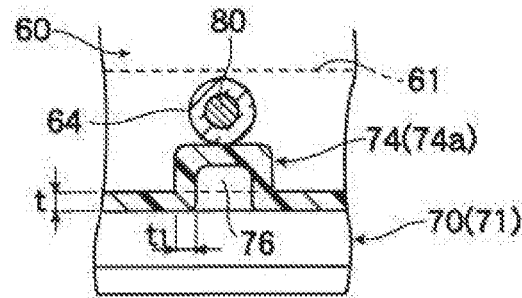
FIG.6A
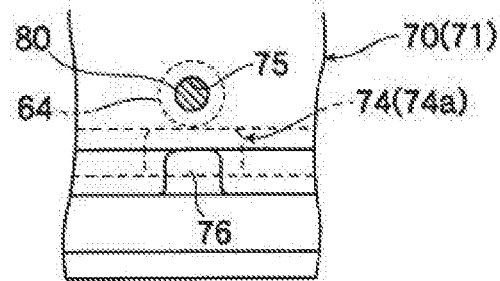
FIG.6B
Fig. 7
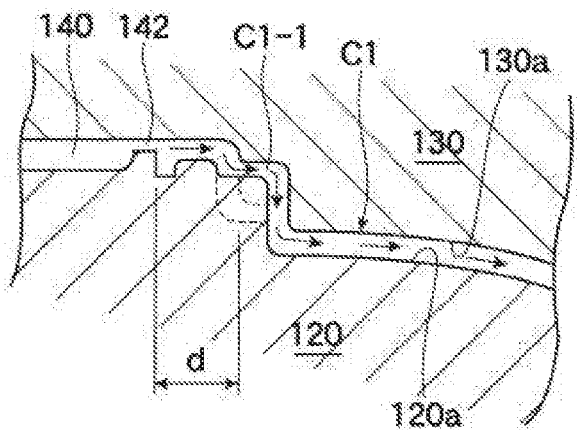

PRIOR ART

RESIN MOLDED PRODUCT AND METHOD FOR PRODUCING RESIN MOLDED PRODUCT

TECHNICAL FIELD

The present invention relates to a resin molded product. Further, the present invention relates to a method for producing a resin molded product.

BACKGROUND ART

Recently, with diversification of lamp design needs, it is required to form large-sized and complicated shapes for constituent members of an automobile lamp such as an extension reflector. A resin molded product made of PBT-based material with high fluidity is used for meeting those needs. The resin molded product can be easily produced to be thin and lightweight by injection molding even in various complicated shapes.

For example, when molding a resin molded product (e.g., an extension reflector) 1 provided with a protrusion (e.g., ribs for positioning a front cover) 2 as shown in FIG. 8, molds 3, 4 are clamped so as to perform injection molding using a cavity C' defined by molding surfaces 3a, 4a as shown in FIG. 9. Apart of molten resin 6 injected into the cavity C' from a side gate 5a flows into a portion C'1 corresponding to the protrusion 2 in the cavity C'. Since an end of the protrusion corresponding portion C'1 is blocked, the molten resin 6 does not flow further and stays in the protrusion corresponding portion C'1, which causes an unfilled portion 7. In the unfilled portion 7, moisture and volatile components contained in the molten resin 6 present as gas, and as the injection of the molten resin 6 progresses, the unfilled portion 7 is compressed and the gas escapes to the outside of the molds 3, 4 along the molding surface 3a. A trace made at the gas escaping appear as a silver streak (a stripe of the silver streak) on a design surface 1a of the resin molded product 1, which deteriorates an appearance of the resin molded product 1.

Therefore, various proposals have been made to prevent the silver streak from appearing when the injection molding is performed.

For example, in an injection molding method described in Patent Document 1, at injection molding of a lens cover (also referred to as a front cover) having a thicker seal rib than a design surface at the periphery of an opening portion, the resin is injected from a side valve gate to a seal rib portion of the cavity at the beginning of the injection molding, and in a stage where the molten resin is filled to a predetermined position, the side valve gate is closed and the resin is injected from a design surface valve gate to the design surface portion of the cavity, so that the flow of the molten resin does not stay in the middle of the cavity and the unfilled portion is not generated in the cavity, and therefore, no silver streak appears on the design surface of the lens cover.

PRIOR ART DOCUMENT

Patent Document

Patent Document 1: JP-A-2010-214749

SUMMARY OF THE INVENTION

Problem to be Solved by the Invention

However, in Patent Document 1, since it is necessary to provide both a side valve gate and a design surface valve gate in a mold and to control the opening and closing for both of the valve gates, the structure of the molding apparatus is complicated.

In addition, although the silver streak does not actually appear on the design surface of the molded lens cover, since the trace of the design surface valve gate is newly made, it cannot be said that the appearance of the lens cover is totally improved.

An object of the present invention is to provide a resin molded product with no silver streak appearing thereon, which is produced without using a molding apparatus having a complicated structure. In addition, an object of the present invention is to provide a method for producing the resin molded product with no silver streak appearing thereon, without using a molding apparatus having a complicated structure.

Means for Solving the Problem

A resin molded product according to an aspect of the present invention includes:
   a resin molded product main body; and
   a protrusion integrally formed with the resin molded product main body and protruding from the resin molded product main body.
   At injection molding of the resin molded product, molten resin flows through a portion corresponding to the protrusion in a cavity defined by a pair of molds,
   a concave portion is formed on a rear side of the protrusion, and
   a bulging portion having a hollow bag shape is formed on a front side of the protrusion.

According to the configuration above, the resin molded product with no silver streak appearing thereon cab be produced without using a molding apparatus having a complicated structure.

The molten resin may be injected into the cavity from a side gate at the injection molding of the resin molded product. The protrusion may protrude from a design surface of the resin molded product.

Since the silver streak occurs along a linear direction connecting the portion corresponding to the protrusion (hereinafter, referred to as protrusion corresponding portion) in the cavity from the side gate, there is a problem when the direction in which the silver streak occurs is directed to the design surface of the resin molded product. Herein, the design surface refers to a region which can be visually recognized when an automobile lamp is viewed from the front, for example, excluding a region which is hidden behind a bumper or the like and cannot be seen. Therefore, the present invention is particularly effective when the protrusion protrudes from the design surface of the resin molded product. As described above, since the silver streak does not appear on the design surface of the resin molded product, the appearance of the resin molded product can be improved.

The side gate and the portion corresponding to the protrusion in the cavity may be arranged close to each other.

At the injection molding of the resin molded product, since the molten resin is injected into the cavity from the side gate at a high pressure, the faster the moving speed of the molten resin in the vicinity of the gate is, the faster the flow of the resin in the protrusion corresponding portion of the cavity is. For this reason, the molten resin tends to stay in the protrusion corresponding portion particularly at a place where the resin is hard to flow, so that an unfilled portion tends to be generated.

Therefore, the present invention is particularly effective when the side gate and the protrusion corresponding portion are arranged close to each other.

Specifically, the inventors have found that in the conventional resin molded product 1 (FIG. 8) formed with the protrusion 2, there is a possibility that the resin stays in the protrusion corresponding portion C'1, and the portion 7 unfilled with molten resin 6 which causes the silver streak (a stripe of the silver streak) is generated when a distance d1 between the protrusion corresponding portion C'1 of the cavity C' and the side gate 5a is 50 mm or less. Therefore, the present invention is particularly effective in a case where the resin molded product 1 is formed using a mold in which the side gate 5a and the protrusion corresponding portion C'1 are arranged close to each other (for example, with the distance d1 equal to or less than 50 mm), in other words, the distance between the protrusion 2 and a gate trace 1b is 50 mm or less.

The thickness of the bulging portion may be substantially same as a thickness of the resin molded product main body in a vicinity of the bulging portion.

As shown in FIGS. 1 and 2, the thickness T1 of the bulging portion is substantially same as the thickness T of the resin molded product main body in the vicinity of the bulging portion, and as shown in FIG. 3, a protrusion corresponding portion C-1 in a cavity C extends from an entrance C-1a to an exit C-1b of the molten resin in a form of a hollow bag with a space (distance) T1 (=T) which is same as the space (distance) T of the cavity C, so that the molten resin flowing in from the entrance C-1a of the protrusion corresponding part C-1 flows without staying in the middle and flows out smoothly from the exit C-1b at the injection molding. Accordingly, the generation of the portion unfilled with molten resin which causes the silver streak (the stripe of the silver streak) is further suppressed in the protrusion corresponding portion C-1 of the cavity C.

A resin molded product according to another aspect of the present invention includes:
   a resin molded product main body; and
   a protrusion integrally formed with the resin molded product main body and protruding from the resin molded product main body.

A concave portion is formed on a rear side of the protrusion, and
   a thickness of the protrusion is substantially same as a thickness of a part of the resin molded product main body in a vicinity of the protrusion.

According to the configuration above, the resin molded product with no silver streak appearing thereon can be produced without using a molding apparatus having a complicated structure.

A method for producing the resin molded product according to a further aspect of the present invention includes:
   clamping an upper mold having a concave portion and a lower mold having a convex portion opposed to the concave portion; and
   injecting molten resin into a cavity formed between the upper mold and the lower mold.

The molten resin flows through a part of the cavity formed between the concave portion and the convex portion.

According to the method above, a method for producing the resin molded product with no silver streak appearing thereon, without using a molding apparatus having a complicated structure can be provided.

BRIEF DESCRIPTION OF DRAWINGS

FIGS. 2A and 2B are longitudinal section views of the resin molded product shown in FIG. 1 at a protruding position, wherein FIG. 2A is a sectional view taken along a line IIa-IIa shown in FIG. 1, and FIG. 2B is a sectional view taken along a line IIb-IIb shown in FIG. 1.

FIGS. 6A and 6B are cross-sectional views of the extension reflector at the protruding position, wherein FIG. 6A is a sectional view taken along a line VIa-VIa shown in FIG. 5, and FIG. 6B is a sectional view taken along a line VIb-VIb shown in FIG. 5.

FIG. 7 is a sectional view showing a main part of a cavity of molds for molding an extension reflector.

DESCRIPTION OF EMBODIMENTS

Hereinafter, an embodiment of the present invention (hereinafter, referred to as the present embodiment) will be described below with reference to the drawings.

Figure 1:
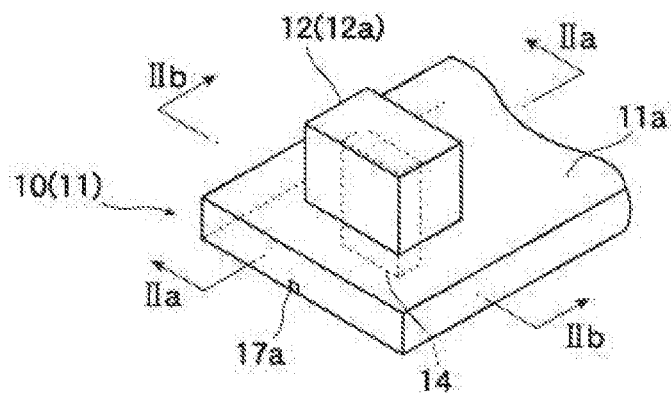
FIG. 1 is a perspective view of a resin molded product according to a first embodiment.
Figure 2A:
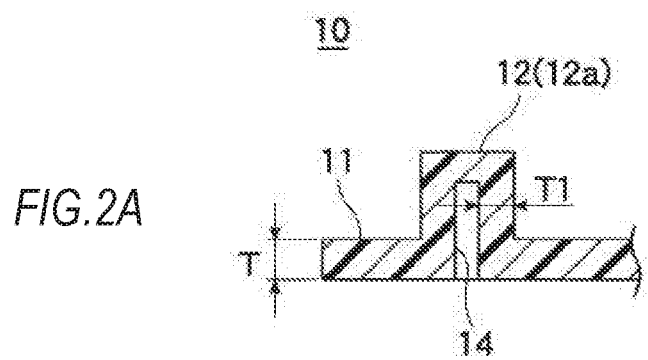
Figure 2B:
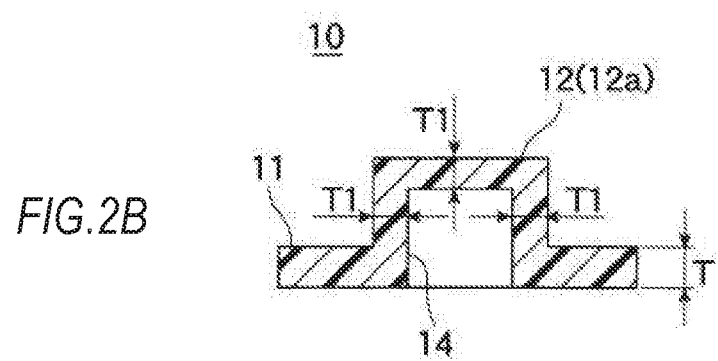
Figure 3:
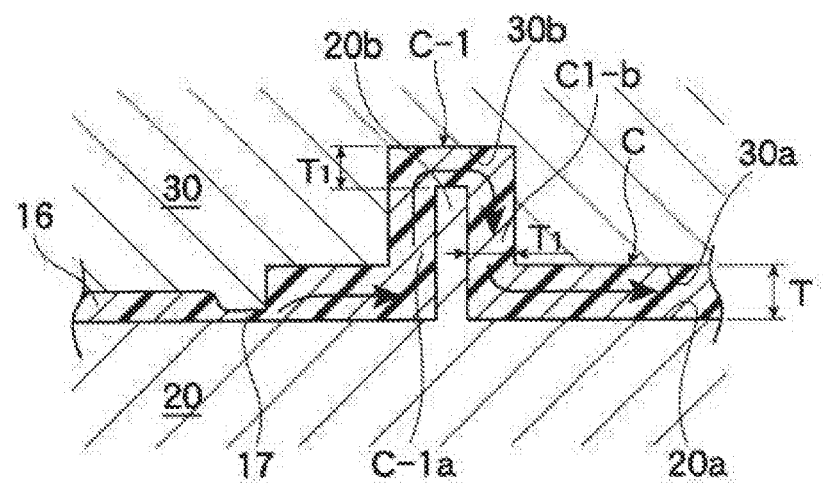
FIG. 3 is a sectional view of a main part of a cavity of molds for molding the resin molded product.

FIGS. 1 to 3 show a first embodiment, and FIG. 1 is a perspective view of a resin molded product according to the first embodiment. FIGS. 2A and 2B are longitudinal section views of the resin molded product at a protruding position. FIG. 3 is a sectional view of a main part of a cavity of molds for molding the resin molded product.

As shown in FIGS. 1 and 2, in the resin molded product 10 configuring an automobile lamp, a rectangular protrusion 12 which functions as reinforcement or positioning with respect to other lamp constituent members and protrudes perpendicularly to a resin molded product main body 11 is integrally formed on a design surface 11a side of the resin molded product main body 11 formed into a flat plate shape. As shown in FIGS. 2A and 2B, the protrusion 12 is configured by a bulging portion 12a having a hollow bag shape which bulges toward a front side with a concave portion 14 formed on a rear side thereof. The thickness T1 of the bulging portion 12a configuring the protrusion 12 is formed to be substantially same as the thickness T of the resin molded product main body 11. The reference numeral 17a in FIG. 1 is a gate trace formed when the resin molded product 10 is injection molded by a cavity C shown in FIG. 3.

The lower mold 20 and the upper mold 30 shown in FIG. 3 include the cavity C for injection molding the resin molded product 10. The cavity C for molding the resin molded product 10 is defined by clamping the lower mold 20 and the upper mold 30, and molten resin guided to a runner 16 is injected into the cavity C via a side gate 17.

That is, the upper mold 30 on a movable side is configured to be movable in an approaching and separating direction (an upper-lower direction) with respect to the lower mold 20 on a fixed side, and molding surfaces 20a, 30a for defining the cavity C are formed on opposite divided surfaces of the lower mold 20 and the upper mold 30.

As described above, since the protrusion 12 of the resin molded product 10 is configured by the bulging portion 12a having a hollow bag shape, a convex portion 20b corresponding to the concave portion 14 on the rear side of the protrusion 12 is formed on the molding surface 20a of the lower mold 20, and a concave portion 30b corresponding to the bulging portion 12a is formed on the molding surface 30a of the upper mold 30. When the lower mold 20 and the upper mold 30 are clamped, the convex portion 20b of the lower mold 20 and the concave portion 30b of the upper mold 30 are engaged with each other in the upper-lower direction, and a molten resin flow path C-1 which is a portion corresponding to the protrusion 12 (bulging portion 12a) of the cavity C and extends in a bag shape so as to surround the convex portion 20b with the constant distance (space) T1 which is substantially same as the distance (space) T of the cavity C is configured between the convex portion 20b and the concave portion 30b.

As indicated by arrows in FIG. 3, the molten resin injected into the cavity C from the side gate 17 flows into the protrusion corresponding part C-1 which is a continuous resin flow path and flows smoothly without staying. Specifically, the protrusion corresponding portion C-1 of the cavity C extends from an entrance C-1a to an exit C-1b of the molten resin in the form of a hollow bag with a space (distance) T1 (=T) which is same as the space (distance) T of the cavity C, so that the molten resin flowing in from the entrance C-1a of the protrusion corresponding part C-1 flows without staying in the middle and flows out smoothly from the exit C-1b at the injection molding. Then, the entire cavity C is filled with resin, so that the resin molded product 10 is molded.

Accordingly, the generation of the portion unfilled with molten resin which causes a silver streak (a stripe of the silver streak) on the design surface 11a of the resin molded product 10 is suppressed as much as possible at the protrusion corresponding portion C-1 of the cavity C at the injection molding.

FIGS. 4 to 7 show an example in which a resin molded product is applied to an extension reflector.

Figure 4:
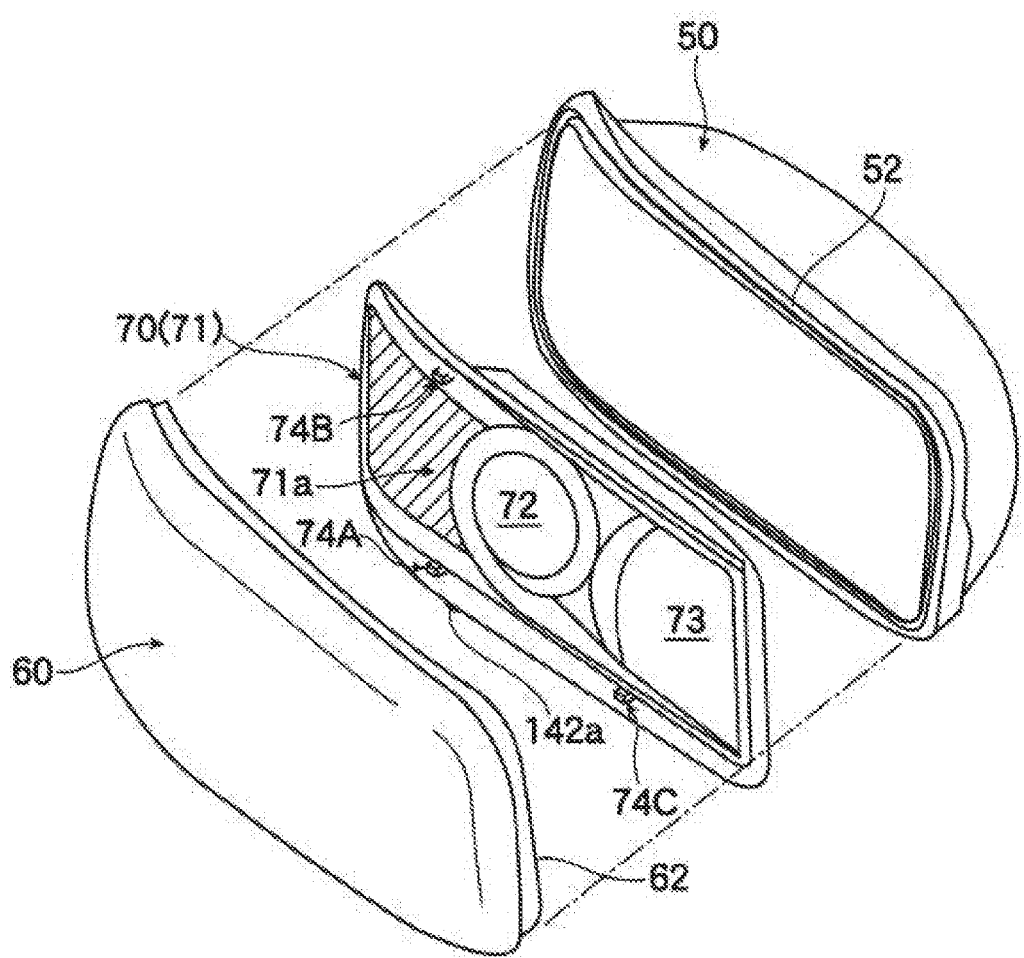
FIG. 4 is an exploded perspective view of a front cover, an extension reflector and a lamp body which are main parts of a head lamp.

As shown in FIG. 4, in an automobile head lamp, two light source units (not shown) for forming a predetermined light distribution are arranged adjacent to each other in the right and left in a container-shaped lamp body 50 which opens at a front side and forms a lamp chamber, a front cover 60 is assembled to the front opening portion of the lamp body 50, and for example, a black extension reflector 70 is assembled to the inside of the front cover 60 so that the inside of the lamp chamber is viewed as being integral.

The extension reflector 70 is configured by an extension reflector main body 71 having a curved shape along the front cover 60 and has opening portions 72, 73 which do not prevent light emission from the light source units. The extension reflector 70 is formed in a complicated shape extending in a three-dimensional direction along the front opening portion of the lamp body 50 so as to conceal the inside of the lamp chamber except the light source units and is made of a PBT-based material which is lightweight and has excellent fluidity at molding.

In order to assemble the front cover 60 and the extension reflector 70 to the lamp body 50, the extension reflector 70 is fixedly integrated in advance by fastening screws 80 (refer to FIG. 5) to the front cover 60, seal legs 62 formed at peripheral portions of the front cover 60 are assembled to seal grooves 52 formed at peripheral portions of the front opening portion of the lamp body 50, such that for example, uneven lance engaging portions (not shown) between the seal legs 62 and the seal grooves 52 are engaged, and the lamp body 50 and the front cover 60 are fixed so as to be prevented from slipping out. Reference numeral 54 represents a sealing material.

Figure 5:
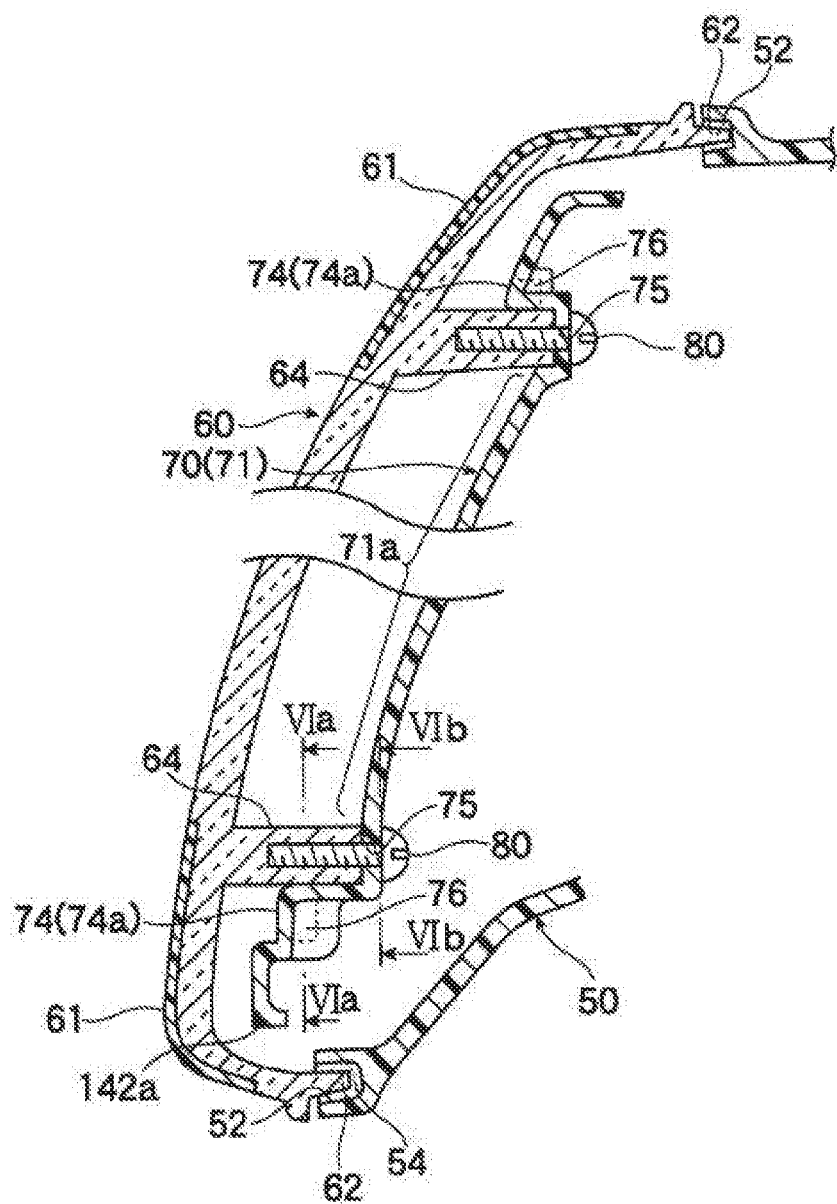
FIG. 5 is a longitudinal section view of a main part of the head lamp.
Figure 8:
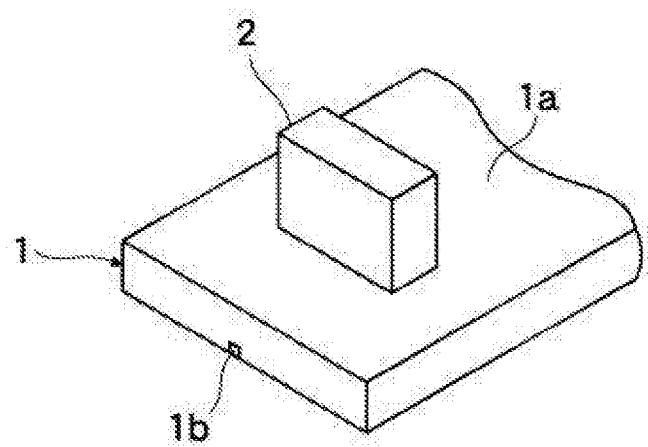
FIG. 8 is a perspective view of a conventional resin molded product.
Figure 9:
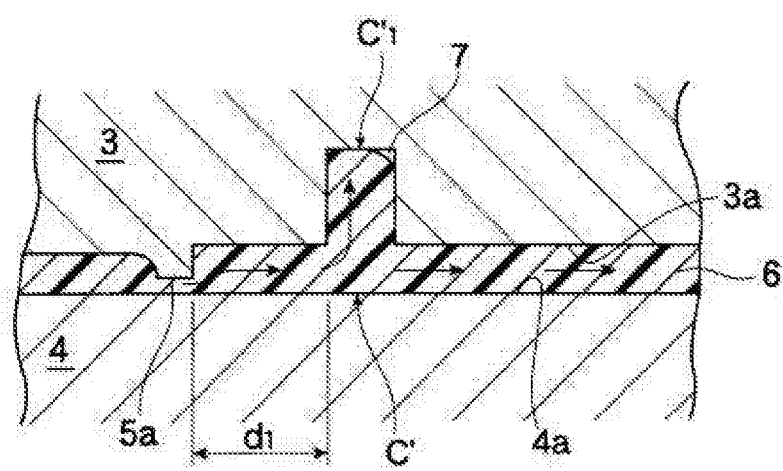
FIG. 9 is a sectional view of a main part of a cavity of molds for molding the resin molded product shown in FIG. 8.

In addition, bosses 64 are formed to protrude at three predetermined positions on a rear surface of the front cover 60, and positioning protrusions 74 (74A, 74B, 74C), fastening screws 80 and insertion cylinder holes 75 which can respectively abut against each of the bosses 64 on the front cover 60 side are provided at predetermined positions on the front side of the extension reflector 70 (the extension reflector main body 71) which are corresponding to the bosses 64 when the front cover 60 and the extension reflector 70 are fixed by screws (refer to FIGS. 4 and 5). In the present embodiment, as shown in FIG. 4, the positioning protrusions 74 and the cylinder holes 75 are provided in the vicinity of the opening portions 72 and 73 on a lower side edge of the extension reflector 70 and at a left side of the opening portion 72 on an upper side edge.

As shown in FIGS. 6A and 6B, the positioning protrusion 74 is configured by a bulging portion 74a having a hollow bag shape which bulges toward the front side with a concave portion 76 formed on a rear side thereof. The extension reflector main body 71 is formed with a substantially constant thickness t as a whole, and the thickness t1 of the bulging portion 74a is also substantially same as the thickness t (t1=t) of a region around the protrusion 74 (bulging portion 74a) in the extension reflector main body 71. As will be specifically described later, at the injection molding of the extension reflector 70, it is configured such that the molten resin smoothly flows through the portion C1-1 corresponding to the protrusion 74 of the cavity C for molding the extension reflector 70, and the molten resin does not stay in the positioning protrusion corresponding portion C1-1.

As shown in FIG. 5, a black surface resin layer 61 is formed on the entire front peripheral portion of the transparent front cover 60, and the entire peripheral region of the extension reflector 70 including a portion screw fixing with the extension reflector 70 is hidden, so that the appearance (invisibility) viewed from the front of the head lamp is improved.

Therefore, although the vicinity of a center portion of the extension reflector 70 can be seen through the transparent front cover 60, the peripheral portion thereof is hidden by the black surface resin layer 61 of the front cover 60 and cannot be seen. That is, a range shown by reference numeral 71a in FIG. 5, which can be seen through the front cover 60, is a design surface of the extension reflector 70.

Next, the cavity C1 injected with the molten resin at the injection molding of the extension reflector 70 will be described below with reference to FIG. 7.

The cavity C1 for molding the extension reflector 70 is defined by a molding surface 120a of a lower mold 120 on a fixed side and a molding surface 130a of an upper mold 130 on a movable side which is movable in an approaching and separating direction with respect to the lower mold 120.

In addition, a side gate 142 which communicates with a runner 140 which is a resin passage and injects the resin into the cavity C1 is provided at a predetermined position of divided surfaces of the molds 120, 130. The side gate 142 is provided at the predetermined position where the volume of the cavity C1 is substantially equal in the right and left direction across the gate, so that the molten resin to be injected into the cavity C1 formed by the lower mold 120 and the upper mold 130 efficiently fills the entire cavity C1 in a short time. Specifically, as shown in FIG. 4, in the extension reflector 70, the two opening portions 72, 73 are provided at a right side in the left-right direction, so that the side gate 142 (refer to FIG. 7) is provided at a predetermined position of the cavity C1 corresponding to a gate trace 142*a* (refer to FIGS. 4 and 5) remaining somewhat at a left side of the center portion in the left-right direction of the formed extension reflector 70.

More specifically, the side gate 142 is arranged close to the protrusion corresponding portion C-1 so that a distance d between the side gate 142 from which the molten resin is injected and the protrusion corresponding portion C1-1 corresponding to the protrusion 74A in the cavity C is 50 mm or less. The design surface 71*a* (a hatched region shown in FIG. 4) of the extension reflector 70 is positioned on a straight line connecting the side gate 142 to the protrusion corresponding portion C1-1 of the cavity C1, in other words, a straight line connecting the gate trace 142*a* of the extension reflector 70 which is a molded product to the protrusion 74A.

Therefore, at the injection molding of the extension reflector 70, there is a possibility that the silver streak (the stripe of the silver steak) appears on the design surface 71*a* of the extension reflector 70 when the portion unfilled with molten resin is generated in the protrusion corresponding portion C1-1 of the cavity C1.

In the present embodiment, since the protrusion 74A is configured by the bulging portion 74*a* having a hollow bag shape which bulges toward the front side with the concave portion 76 formed on the rear side thereof, the protrusion corresponding part C1-1 of the cavity C1 extends in a hollow bag shape while maintaining a constant space (t1) and constitutes a part of the cavity C1 which is a continuous resin flow path.

Therefore, as indicated by arrows in FIG. 7, the molten resin (PBT-based material) injected into the cavity C1 from the side gate 142 flows into the protrusion corresponding part C-1 which is a continuous resin flow path smoothly without staying, and the entire cavity C1 is filled with the molten resin. Accordingly, the portion unfilled with molten resin which causes the silver streak will not be generated in the protrusion corresponding portion C1-1 of the cavity C1 at the injection molding. Therefore, the silver streak does not appear (or the occurrence of the silver streak is suppressed as much as possible) on the design surface 71*a* of the extension reflector 70 molded by the cavity C1, and an extension reflector 70 with excellent appearance can be molded.

In the present embodiment, all three positioning protrusions 74 (74A, 74B, 74C) provided on the extension reflector 70 are configured by bulging portions 74*a* having a hollow bag shape which bulges toward the front side with the concave portion 76 formed on a rear side thereof. Incidentally, portions corresponding to the protrusions 74B and 74C of the cavity C1 are positioned at a distance of 50 mm or more from the side gate 142, and the design surface 71*a* of the extension reflector 70 is not positioned on the straight line connecting the gate trace 142*a* to the protrusions 74B and 74C.

Therefore, the silver streak will not appear (or the occurrence of the silver streak is suppressed as much as possible) on the design surface 71*a* of the extension reflector 70 even if the molten resin temporarily stays in the portions corresponding to the protrusions 74B and 74C of the cavity C1 at the injection molding of the extension reflector 70.

Accordingly, the positioning protrusions 74B and 74C are not necessarily configured, unlike the protrusion 74A, to have a hollow bag shape which bulges toward the front side with the concave portion 76 formed on the rear side thereof, and may be configured in a conventional solid plate shape with a predetermined thickness.

In addition, in the present embodiment, although the extension reflector 70 provided with the positioning protrusions 74A, 74B, and 74C used for fixing the front cover 60 is described, the present invention can also be applied to an extension reflector provided with reinforcing ribs or a lamp body provided with positioning protrusions and reinforcing ribs.

Although the embodiments of the present invention have been described above, there is no need to explain that the technical scope of the present invention should not be limited by the description of this embodiment. It is to be understood by those skilled in the art that the present embodiment is merely an example and that various modifications can be made within the scope of the invention described in the scope of the claims. The technical scope of the present invention should be determined based on the scope of the invention described in the claims and the scope of equivalents thereof.

The present application incorporates herein contents disclosed in Japanese Patent Application (Japanese Patent Application No. 2015-125349) filed on Jun. 23, 2015.

The invention claimed is:

1. A resin molded product comprising:
   a resin molded product main body formed in a flat plate shape; and
   a protrusion integrally formed with the resin molded product main body and protruding from a central portion of the flat plate shape of the resin molded product main body, the flat plate shape surrounding all sides of the protrusion,
   wherein during injection molding of the resin molded product, molten resin flows through a portion corresponding to the protrusion in a cavity defined by a pair of molds,
   wherein a concave portion is formed on a rear side of the protrusion and extends into the protrusion,
   wherein a bulging portion having a hollow bag shape is formed on a front side of the protrusion, and
   wherein a gate trace is offset by a distance from the protrusion.

2. The resin molded product according to claim 1,
   wherein the molten resin is injected into the cavity from a side gate corresponding to a position of the gate trace during the injection molding of the resin molded product, and
   wherein the protrusion protrudes from a design surface of the resin molded product.

3. The resin molded product according to claim 2,
   wherein the distance between the gate trace and the portion corresponding to the protrusion is 50 mm or less.

4. The resin molded product according to claim 1,
   wherein a thickness of the bulging portion is substantially same as a thickens of the resin molded product main body in a vicinity of the bulging portion.

5. The resin molded product according to claim 1, wherein the resin molded product is formed into a flat plate shape;
   the protrusion for positioning a front cover is provided between the gate trace disposed at a side edge of the resin molded product main body and a design surface of the resin molded product; and
   the entire protrusion is configured to bulge to the front side of the protrusion.

6. A resin molded product comprising:
a resin molded product main body formed in a flat plate shape;
a protrusion integrally formed with the resin molded product main body and protruding from a central portion of the flat plate shape of the resin molded product main body, the flat plate shape surrounding all sides of the protrusion; and
a gate trace that is offset by a distance from the protrusion,
wherein a concave portion is formed on a rear side of the protrusion and extends into the protrusion, and
wherein a thickness of the protrusion is substantially same as a thickness of a part of the resin molded product main body in a vicinity of the protrusion.

* * * * *